3,402,062
CURL-RESISTANT COMPOSITE
PACKAGING SHEET
Joseph C. Mohan, Fredericksburg, Va., assignor to FMC Corporation, Philadelphia, Pa., a corporation of Delaware
No Drawing. Filed Oct. 8, 1963, Ser. No. 314,604
7 Claims. (Cl. 117—68)

This invention relates to a curl-resistant sheet of hydrophilic, non-fibrous cellulosic material having a resinous moistureproof coating on only one side thereof.

Non-fibrous, hydrophilic cellulosic films such as those prepared from regenerated cellulose which are provided with a moistureproof coating on only one side have a tendency to curl when placed in environments of temperature and relative humidity which are common in commercial packaging operations. It is imperative, in such operations, that the individual sheets and stacks thereof remain perfectly flat for mechanical manipulation.

It is an object of the present invention to provide a composite sheet of hydrophilic, non-fibrous cellulosic base material having a resinous moistureproof coating on only one side thereof which has a greatly reduced curl tendency when placed in commercial packaging environments.

It is another object of this invention to provide a regenerated cellulose film having a resinous, moistureproof coating on only one side thereof which has a greatly reduced curl tendency when placed in commercial packaging environments.

These and other objects are accomplished in accordance with this invention which relates to a composite sheet comprising a base sheet of non-fibrous, hydrophilic cellulosic material, a resinous moistureproof coating on one side of said base sheet, and a layer consisting of a $C_{12}$–$C_{18}$ saturated, straight chain, aliphatic alcohol uniformly covering the other side of said base sheet in an amount sufficient to improve the curl tendency of the sheet.

The base sheet of this invention is any non-fibrous, hydrophilic cellulosic material, for example, regenerated cellulose film and hydroxyethyl cellulose ether film.

The resinous moistureproof coatings for the cellulosic base sheet are well known in the packaging art and include preferably heat-sealable materials, for example, cellulose nitrate containing a moistureproofing wax, mono-olefin polymers and copolymers, e.g., polyethylene, polypropylene, ethylene-propylene copolymers, ethylene-vinyl acetate copolymers; vinyl resins, e.g., vinyl chloride polymers and copolymers, vinylidene chloride copolymers; acrylic resins, etc. These coatings are applied, for example, in the form of lacquers or organic solutions, in the form of latexes or aqueous dispersions, by hot melt extrusion onto a moving base sheet, or in any other expeditious manner. Cellulose nitrate compositions and vinylidene chloride copolymers are preferred resinous coatings for this invention.

Saturated, straight chain, aliphatic alcohols which are useful for this invention include, for example, 1-dodecanol (lauryl alcohol), 6-dodecanol, 1-tridecanol, 1-tetradecanol (myristyl alcohol), 1-pentadecanol, 1-hexadecanol (cetyl alcohol), 1-heptadecanol, and 1-octadecanol. Those having a melting point exceeding 35° C. are more advantageously used. The preferred alcohol for this invention is cetyl alcohol.

The above alcohols are solid materials and are applied to the uncoated side of a coated base sheet in the desired amount most advantageously by first mixing the same in a volatile carrier or solvent. The liquid is then applied to the uncoated side of the base sheet and the carrier evaporated. Volatile liquid carriers for the solid alcohols of this invention include toluene, lower alcohols, ketones, ethers, water, etc.

In order to obtain the desired amount of solid alcohol on the base sheet, a concentration of from about 1 to about 10% by weight, preferably from about 2 to about 6% of the alcohol in the volatile liquid carrier is used. The amount remaining on the base sheet after evaporation of the carrier generally ranges from about 0.1 to about 2.0% based on the weight of the composite film.

The following example is set forth in order to demonstrate the invention.

EXAMPLE

A regenerated cellulose film having a thickness of about 1 mil and coated on one side with a moistureproof cellulose nitrate coating composition having a thickness of about 0.25 mil, was treated by applying a liquid film of a solution of cetyl alcohol at a concentration of 4% in toluene, to the uncoated surface thereof. The toluene was evaporated, leaving a film of the cetyl alcohol in an amount of about 0.75% based on the weight of the composite film. The resulting film was cut to 15 inch by 15 inch sheets and stacked in a 500-sheet pack. At 21% and 31% relative humidity the stacked sheets showed only a slight trace of curl while untreated film in similar stacks showed a bad tendency to curl.

Various changes and modifications may be made practicing the invention without departing from the spirit and scope thereof and, therefore, the invention is not to be limited except as defined in the appended claims.

I claim:
1. A composite sheet comprising a base sheet of a non-fibrous, hydrophilic cellulosic material, a resinous moistureproof coating on only one side of said base sheet, and a layer consisting of a $C_{12}$–$C_{18}$ saturated, straight chain, aliphatic alcohol uniformly covering the other side of said base sheet in an amount sufficient to inhibit the curl tendency characteristics of the sheet.

2. A composite sheet comprising a base sheet of a non-fibrous regenerated cellulose, a resinous moistureproof coating on only one side of said base sheet, and a layer consisting of a $C_{12}$–$C_{18}$ saturated, straight chain, aliphatic alcohol uniformly covering the other side of the base sheet in an amount ranging from about 0.1 to 2.0% based on the weight of the composite sheet.

3. A composite sheet comprising a base sheet of non-fibrous, regenerated cellulose, a resinous, heat-sealable, moistureproof coating on only one side of said base sheet, and a layer consisting of cetyl alcohol in an amount ranging from about 0.1 to 2.0% based on the weight of the composite sheet uniformly covering the other side of said base sheet.

4. The composite sheet of claim 3 wherein the moistureproof coating is a cellulose nitrate composition.

5. The composite sheet of claim 3 wherein the moistureproof coating is a vinylidene chloride copolymer.

6. The composite sheet of claim 3 wherein the moistureproof coating is film-forming polyethylene.

7. The composite sheet of claim 3 wherein the moistureproof coating is a vinyl chloride copolymer.

References Cited

UNITED STATES PATENTS

| | | | |
|---|---|---|---|
| 1,614,490 | 1/1927 | Poorman | 117—36.3 |
| 2,072,943 | 3/1927 | Cohoe | 117—36.3 |
| 1,603,499 | 10/1926 | Wilson | 117—68 |
| 2,047,269 | 7/1936 | Kallock | 117—145 X |
| 2,182,765 | 12/1939 | Silsby | 117—145 X |
| 2,808,340 | 10/1957 | Learn | 117—145 X |
| 2,812,279 | 11/1957 | Nadeau | 117—68 X |
| 3,052,553 | 9/1962 | McKillip et al. | 117—68 X |
| 3,223,535 | 12/1965 | Rosser | 117—68 X |

FOREIGN PATENTS 790,201   2/1958   Great Britain.

MURRAY KATZ, *Primary Examiner.*